(12) United States Patent
Brezovnik et al.

(10) Patent No.: US 6,827,305 B2
(45) Date of Patent: Dec. 7, 2004

(54) FOOD PROCESSOR

(75) Inventors: Peter Brezovnik, Mozirje (SI); Henrik Pavlovic, Ljubno Ob Savinji (SI); Jurij Pesec, Petrovce (SI); Igor Zibret, Smartno Ob Paki (SI)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 9 days.

(21) Appl. No.: 10/260,468

(22) Filed: Sep. 30, 2002

(65) Prior Publication Data

US 2003/0066917 A1 Apr. 10, 2003

Related U.S. Application Data

(63) Continuation of application No. PCT/EP01/02178, filed on Feb. 26, 2001.

(30) Foreign Application Priority Data

Mar. 31, 2000 (DE) .......................................... 100 16 331

(51) Int. Cl.[7] .............................................. A47J 43/046
(52) U.S. Cl. ................... 241/101.2; 241/92; 241/282.2; 366/283
(58) Field of Search ............................... 241/92, 282.2, 241/282 B, 101.2; 366/282, 283

(56) References Cited

U.S. PATENT DOCUMENTS

| 4,744,522 A | * | 5/1988 | Borgmann et al. ............ 241/92 |
| 5,445,070 A | * | 8/1995 | Rebel .......................... 99/511 |
| 6,000,651 A | * | 12/1999 | Zibret et al. ............. 241/282.1 |

FOREIGN PATENT DOCUMENTS

| DE | 30 45 088 A1 | 7/1982 |
| DE | 34 33 164 A1 | 3/1986 |
| DE | 35 45 226 A1 | 6/1987 |
| EP | 0 052 697 A2 | 6/1982 |
| EP | 0 157 128 A1 | 10/1985 |
| EP | 0570685 A1 | * 11/1993 |

* cited by examiner

Primary Examiner—Mark Rosenbaum
(74) Attorney, Agent, or Firm—Laurence A. Greenberg; Werner H. Stemer; Gregory L. Mayback

(57) ABSTRACT

A food processor having a drive subassembly is disposed in the housing and coupled to a first and a second output shaft, each output shaft having with at least one coupling location for an attachment and, in addition, by the interposition of a gear mechanism, the output shafts being driven at different rotational speeds. The coupling of attachments requiring relatively small torques is simplified in that, spaced apart at a different level from its one coupling location, at least one of the two output shafts is provided with an additional coupling location for further attachments.

32 Claims, 2 Drawing Sheets

Fig. 2
Fig. 3
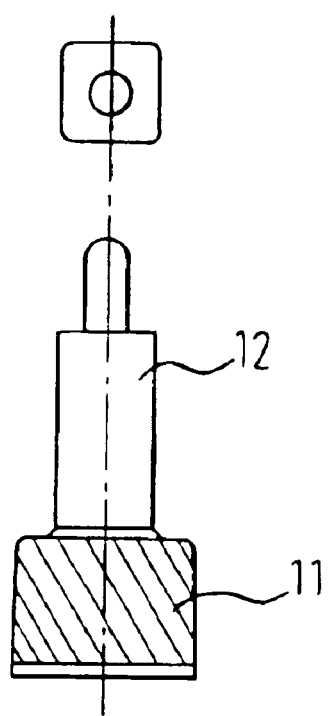
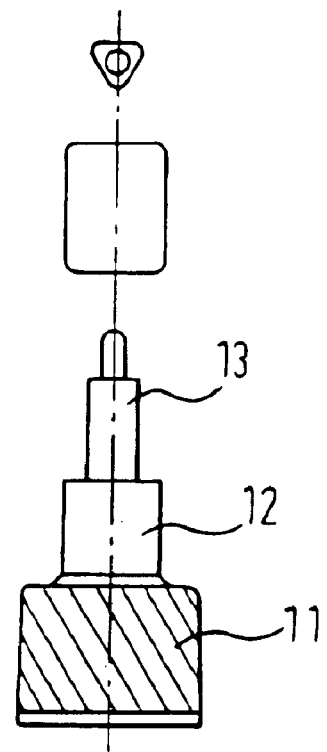

FOOD PROCESSOR

CROSS-REFERENCE TO RELATED APPLICATION

This application is a continuation of copending International Application No. PCT/EP01/02178, filed Feb. 26, 2001, which designated the United States and was not published in English.

BACKGROUND OF THE INVENTION

Field of the Invention

The invention relates to a food processor having a drive subassembly, which is disposed in the housing of the food processor and is coupled to a first and a second output shaft, each output shaft being provided with at least one coupling location for an attachment and in addition, by the interposition of a gear mechanism, the output shafts being driven at different rotational speeds.

Two output shafts that are disposed coaxially in relation to one another are provided in the case of a commercially available food processor, one output shaft being driven at a relatively high rotational speed (approximately 2000 rpm) and the other, by the interposition of a gear mechanism, being driven at a considerably lower rotational speed (approximately 400 rpm). Appropriate attachments corresponding to the type of work that is to be carried out in each case can then be coupled to the output shafts. Because a food processor also has to carry out work that requires a high torque, the coupling locations have to be constructed correspondingly in order to transmit the high torques. These coupling locations are, thus, usually provided with a helical or straight tooth formation or, on their circumference, have a plurality of correspondingly thickly dimensioned ribs by which they engage in groove depressions formed in a plug-on opening of the attachments. The coupling locations are, thus, of complex configuration. If it is desired to couple to one output shaft or the other attachments for operations that require considerably smaller torques, then the plug-on opening of these attachments likewise has to be adapted to the corresponding contour of the coupling location. As far as the torque requirement is concerned, in contrast, considerably more straightforward couplings would be possible.

SUMMARY OF THE INVENTION

It is accordingly an object of the invention to provide a food processor that overcomes the hereinafore-mentioned disadvantages of the heretofore-known devices of this general type and that improves a food processor of the type mentioned in the introduction by straightforward construction measures.

With the foregoing and other objects in view, there is provided, in accordance with the invention, a food processor, including a housing, first and second output shafts disposed in the housing, each of the first and second output shafts having at least one coupling location for at least one attachment, the at least one coupling location of the first output shaft and the at least one coupling location of the second output shaft being disposed sequentially with respect to one another, the first output shaft having at least one further coupling location for at least another attachment, the at least one further coupling location being spaced apart at a distance from the at least one coupling location of the first output shaft, a drive subassembly disposed in the housing, and a gear mechanism coupling the drive subassembly to the first and second output shafts and respectively driving the first and second output shafts at different rotational speeds.

According to the invention, spaced apart at a different level from its one coupling location, at least one of the two output shafts is provided with an additional coupling location for further attachments. The additional coupling location, which is offset in level from the regular coupling location, may, thus, be configured correspondingly for the relatively small torques that may be transmitted. It is possible to provide, here, a form-locking or force-locking connection between the coupling location and attachment. (As set forth herein, a form-locking connection is one that connects two elements together due to the shape of the elements themselves, as opposed to a force-locking connection, which locks the elements together by force external to the elements.) On account of the simplicity of the coupling location, each attachment may be provided with such a coupling location, with the result that each attachment can be coupled directly to the output shaft, thus, dispensing with corresponding intermediate carriers. Such elimination results not just in a reduction in a number of parts, but, at the same time, also in a considerably improved ease of use of the food processor for fitting with attachments. Such a coupling location is particularly suitable for an attachment that requires a relatively small drive torque and, by being disposed upstream of the coupling location, can easily be coupled by the configuration of the same as a plug-on part.

With the objects of the invention in view, there is also provided a food processor, including a housing, first and second output shafts disposed in the housing, each of the first and second output shafts having at least one coupling assembly defining at least one coupling location for at least one attachment, the at least one coupling assembly of the first output shaft and the at least one coupling assembly of the second output shaft being disposed sequentially with respect to one another, the first output shaft having at least one further coupling assembly for at least another attachment, the at least one further coupling assembly being spaced apart at a distance from the at least one coupling assembly of the first output shaft, a drive subassembly disposed in the housing, and a gear mechanism coupling the drive subassembly to the first and second output shafts and respectively driving the first and second output shafts at different rotational speeds.

The first output shaft can having a first rotational axis and at least one first coupling assembly defining at least one first location for a first attachment. The second output shaft can have a second rotational axis and at least one second assembly defining at least one second coupling location for a second attachment. The first rotational axis can be coaxial with the second rotational axis and the first and second coupling assemblies can be disposed sequentially one after another with respect to the first and second rotational axes.

In accordance with another feature of the invention, a connection between the output shaft and attachment that has a particularly straightforward configuration is possible in that the further coupling location has a cross-sectional shape providing a carry-along connection for the attachment that is based on a form fit.

In accordance with a concomitant feature of the invention, a geometrically particularly straightforward shape of the form-fitting connection is achieved in that the further coupling location has a circumferential contour that is other than circular and has a smooth surface or surfaces. Such coupling locations having a smooth circumferential contour are easy to produce.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIGS. 2 and 3 are exploded, cross-sectional views of different embodiments of the coupling assemblies of one output shaft of FIG. 1.

DESCRIPTION OF THE PREFERRED EMBODIMENTS

Figure 1:
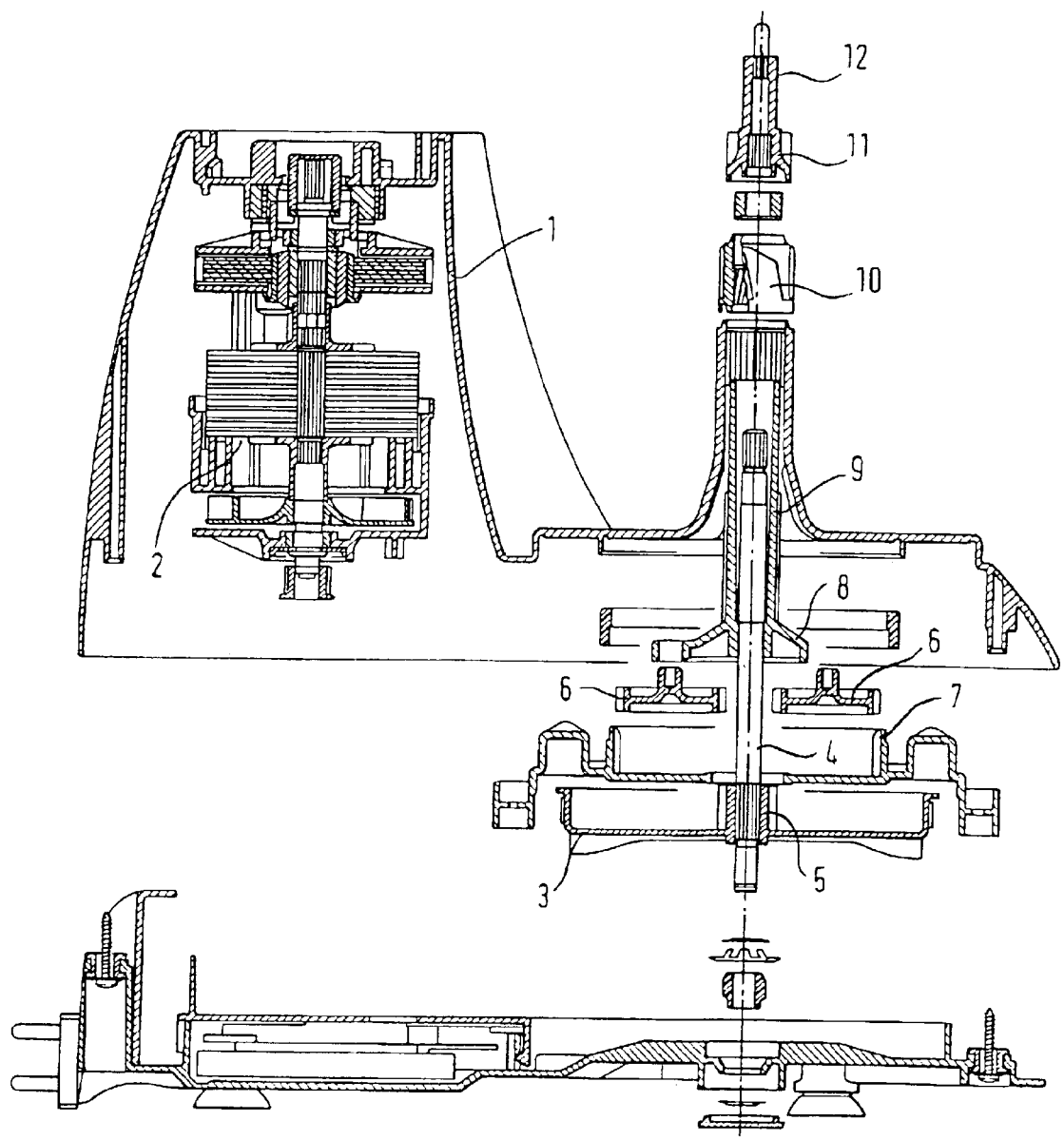
FIG. 1 is an exploded, cross-sectional view of a food processor according to the invention.

Referring now to the figures of the drawings in detail and first, particularly to FIG. 1 thereof, there is shown a drive motor 2 installed in a housing 1 of a food processor. The drive motor 2 drives a gearwheel 3 through a non-illustrated toothed belt. A first output shaft 4 is connected in a rotationally fixed manner to the gearwheel 3. This first output shaft 4 is, thus, driven at a relatively high rotational speed. A sun wheel 5 connected to the gearwheel 3 drives a planet gear including planet wheels 6 and a fixed toothed ring 7. The planet carrier 8, which is connected to the planet wheels 6, merges into a hollow shaft 9, which constitutes a second output shaft and, at its free end, is provided with a first coupling assembly 10 defining a first coupling location for an attachment requiring a relatively low rotational speed. The first output shaft 4 is guided coaxially through the hollow shaft 9 and, at its free end, bears a second coupling assembly 11 defining a second coupling location, which is likewise connected in a rotationally fixed manner to first output shaft 4, for an attachment requiring a relatively high rotational speed.

Spaced apart at a different level from the second coupling assembly 11 at the first output shaft 4 is a third coupling assembly 12, which, in terms of material, may be formed integrally with the coupling assembly 11. Because high torques have to be transmitted through the first and second coupling assemblies 10, 11 at the first and second output shafts 4, 9, these coupling assemblies 10, 11 are provided with a straight or helical tooth formation on their outer circumference. The attachments that can be plugged on at these coupling assemblies 10, 11, thus, have, in their plug-on opening, a groove formation that matches the tooth formation of the coupling assemblies 10, 11.

The third coupling assembly 12 may have, disposed upstream thereof, a fourth coupling assembly 13, which is, once again, offset at a different level from the third coupling assembly 12 (see FIG. 3). The third and fourth coupling assemblies 12, 13 have a cross-sectional shape that is other than circular, e.g., square, rectangular, triangular, or is another polygon, or is oval. FIGS. 2 and 3 depict, above the coupling assemblies 12, 13 illustrated, the corresponding cross-sectional shapes of the latter. These are cross-sectional shapes that have a smooth outer surface and are, thus, easy to produce. The cross-sectional shape of the plug-on opening of the attachments, in addition, is correspondingly straightforward. These shapes allow the relevant attachments to be coupled to the output shaft 4 in a rotationally fixed manner that fulfills the torque requirements of such attachments.

We claim:

1. A food processor, comprising:

a housing;

first and second output shafts disposed in said housing, each of said first and second output shafts having at least one coupling location for at least one attachment, said at least one coupling location of said first output shaft and said at least one coupling location of said second output shaft being disposed sequentially with respect to one another, said first output shaft having at least one further coupling location for at least another attachment, said at least one further coupling location being spaced apart at a distance from said at least one coupling location of said first output shaft;

a drive subassembly disposed in said housing; and a gear mechanism coupling said drive subassembly to said first and second output shafts and respectively driving said first and second output shafts at different rotational speeds.

2. The food processor according to claim 1, wherein said at least one further coupling location has a cross-sectional shape providing a form-fitting carry-along connection for the at least one attachment.

3. The food processor according to claim 2, wherein said at least one further coupling location has a non-circular circumferential contour having at least one smooth surface.

4. The food processor according to claim 2, wherein said at least one further coupling location has a non-circular circumferential contour having smooth surfaces.

5. A food processor, comprising:

attachments;

a housing;

first and second output shafts disposed in said housing, each of said first and second output shafts having at least one coupling location for at least one of said attachments, said at least one coupling location of said first output shaft and said at least one coupling location of said second output shaft being disposed sequentially with respect to one another, said first output shaft having at least one further coupling location for at least another of said attachments, said at least one further coupling location being spaced apart at a distance from said at least one coupling location of said first output shaft;

a drive subassembly disposed in said housing; and a gear mechanism coupling said drive subassembly to said first and second output shafts and respectively driving said first and second output shafts at different rotational speeds.

6. The food processor according to claim 5, wherein said at least one further coupling location has a cross-sectional shape providing a form-fitting carry-along connection for said at least another of said attachments.

7. The food processor according to claim 6, wherein said at least one further coupling location has a non-circular circumferential contour having at least one smooth surface.

8. The food processor according to claim 6, wherein said at least one further coupling location has a non-circular circumferential contour having smooth surfaces.

9. A food processor, comprising:

a housing;

first and second output shafts disposed in said housing, each of said first and second output shafts having at least one coupling assembly defining at least one coupling location for at least one attachment, said at least one coupling assembly of said first output shaft and said at least one coupling assembly of said second output shaft being disposed sequentially with respect to one another, said first output shaft having at least one further coupling assembly for at least another attachment, said at least one further coupling assembly being spaced apart at a distance from said at least one coupling assembly of said first output shaft;

a drive subassembly disposed in said housing; and a gear mechanism coupling said drive subassembly to said first and second output shafts and respectively driving said first and second output shafts at different rotational speeds.

10. The food processor according to claim 9, wherein said at least one further coupling assembly has a cross-sectional shape providing a form-fitting carry-along connection for the at least another attachment.

11. The food processor according to claim 10, wherein said at least one further coupling assembly has a non-circular circumferential contour having at least one smooth surface.

12. The food processor according to claim 10, wherein said at least one further coupling assembly has a non-circular circumferential contour having smooth surfaces.

13. A food processor, comprising:

attachments;

a housing;

first and second output shafts disposed in said housing, each of said first and second output shafts having at least one coupling assembly defining at least one coupling location for at least one of said attachments, said at least one coupling assembly of said first output shaft and said at least one coupling assembly of said second output shaft being disposed sequentially with respect to one another, said first output shaft having at least one further coupling assembly for at least another of said attachments, said at least one further coupling assembly being spaced apart at a distance from said at least one coupling assembly of said first output shaft;

a drive subassembly disposed in said housing; and a gear mechanism coupling said drive subassembly to said first and second output shafts and respectively driving said first and second output shafts at different rotational speeds.

14. The food processor according to claim 13, wherein said at least one further coupling assembly has a cross-sectional shape providing a form-fitting carry-along connection for said another attachment.

15. The food processor according to claim 14, wherein said at least one further coupling assembly has a non-circular circumferential contour having at least one smooth surface.

16. The food processor according to claim 14, wherein said at least one further coupling assembly has a non-circular circumferential contour having smooth surfaces.

17. A food processor, comprising:

a housing;

first and second output shafts disposed in said housing, said first output shaft having a first rotational axis and at least one first coupling location for at least one first attachment, said second output shaft having a second rotational axis and at least one second coupling location for at least one second attachment, said first rotational axis coaxial with said second rotational axis, said at least one first coupling location and said at least one second coupling location being disposed sequentially one after another with respect to said first and second rotational axes, said first output shaft having at least one third coupling location for at least one third attachment, said at least one third coupling location being spaced apart at a distance from said at least one first coupling location along said first rotational axis;

a drive subassembly disposed in said housing; and a gear mechanism coupling said drive subassembly to said first and second output shafts and respectively driving said first and second output shafts at different rotational speeds.

18. The food processor according to claim 17, wherein said at least one third coupling location has a cross-sectional shape providing a form-fitting carry-along connection for said at least one third attachment.

19. The food processor according to claim 18, wherein said at least one third coupling location has a non-circular circumferential contour having at least one smooth surface.

20. The food processor according to claim 18, wherein said at least one third coupling location has a non-circular circumferential contour having smooth surfaces.

21. A food processor, comprising:

attachments;

a housing;

first and second output shafts disposed in said housing, said first output shaft having a first rotational axis and at least one first coupling location for at least a first of said attachments, said second output shaft having a second rotational axis and at least one second coupling location for at least a second of said attachments, said first rotational axis coaxial with said second rotational axis, said at least one first coupling location and said at least one second coupling location being disposed sequentially one after another with respect to said first and second rotational axes, said first output shaft having at least one third coupling location for at least a third of said attachments, said at least one third coupling location being spaced apart at a distance from said at least one first coupling location along said first rotational axis;

a drive subassembly disposed in said housing; and a gear mechanism coupling said drive subassembly to said first and second output shafts and respectively driving said first and second output shafts at different rotational speeds.

22. The food processor according to claim 21, wherein said at least one third coupling location has a cross-sectional shape providing a form-fitting carry-along connection for said third attachment.

23. The food processor according to claim 22, wherein said at least one third coupling location has a non-circular circumferential contour having at least one smooth surface.

24. The food processor according to claim 22, wherein said at least one third coupling location has a non-circular circumferential contour having smooth surfaces.

25. A food processor, comprising:

a housing;

first and second output shafts disposed in said housing, said first output shaft having a first rotational axis and at least one first coupling assembly defining at least one first coupling location for at least one first attachment, said second output shaft having a second rotational axis and at least one second coupling assembly defining at least one second coupling location for at least one second attachment, said first rotational axis coaxial with said second rotational axis, said at least one first coupling assembly and said at least one second coupling assembly being disposed sequentially one after another with respect to said first and second rotational axes, said first output shaft having at least one third coupling assembly for at least one third attachment, said at least one third coupling assembly being spaced apart at a distance from said at least one first coupling assembly along said first rotational axis;

a drive subassembly disposed in said housing; and a gear mechanism coupling said drive subassembly to said first and second output shafts and respectively driving said first and second output shafts at different rotational speeds.

26. The food processor according to claim 25, wherein said at least one third coupling assembly has a cross-sectional shape providing a form-fitting carry-along connection for said at least one third attachment.

27. The food processor according to claim 26, wherein said at least one third coupling assembly has a non-circular circumferential contour having at least one smooth surface.

28. The food processor according to claim 26, wherein said at least one third coupling assembly has a non-circular circumferential contour having smooth surfaces.

29. A food processor, comprising:

attachments;

a housing;

first and second output shafts disposed in said housing, said first output shaft having a first rotational axis and at least one first coupling assembly defining at least one first coupling location for at least a first of said attachments, said second output shaft having a second rotational axis and at least one second coupling assembly defining at least one second coupling location for at least a second of said attachments, said first rotational axis coaxial with said second rotational axis, said at least one first coupling assembly and said at least one second coupling assembly being disposed sequentially one after another with respect to said first and second rotational axes, said first output shaft having at least one third coupling assembly for at least a third of said attachments, said at least one third coupling assembly being spaced apart at a distance from said at least one first coupling assembly along said first rotational axis;

a drive subassembly disposed in said housing; and a gear mechanism coupling said drive subassembly to said first and second output shafts and respectively driving said first and second output shafts at different rotational speeds.

30. The food processor according to claim 29, wherein said at least one third coupling assembly has a cross-sectional shape providing a form-fitting carry-along connection for said third attachment.

31. The food processor according to claim 30, wherein said at least one third coupling assembly has a non-circular circumferential contour having at least one smooth surface.

32. The food processor according to claim 30, wherein said at least one third coupling assembly has a non-circular circumferential contour having smooth surfaces.

* * * * *